United States Patent
Yurievich et al.

(10) Patent No.: US 9,378,414 B2
(45) Date of Patent: Jun. 28, 2016

(54) CHINESE, JAPANESE, OR KOREAN LANGUAGE DETECTION

(71) Applicant: ABBYY Development LLC, Moscow (RU)

(72) Inventors: Atroshchenko Mikhail Yurievich, Moscow (RU); Dmitry Georgievich Deryagin, Moscow (RU); Yuri Georgievich Chulinin, Moscow (RU)

(73) Assignee: ABBYY Development LLC (RU)

( * ) Notice: Subject to any disclaimer, the term of this patent is extended or adjusted under 35 U.S.C. 154(b) by 0 days.

(21) Appl. No.: 14/561,851

(22) Filed: Dec. 5, 2014

(65) Prior Publication Data

US 2015/0178559 A1   Jun. 25, 2015

(51) Int. Cl.
| | |
|---|---|
| *G06K 9/00* | (2006.01) |
| *G06F 17/27* | (2006.01) |
| *G06K 9/32* | (2006.01) |
| *G06F 17/22* | (2006.01) |
| *G06K 9/68* | (2006.01) |

(52) U.S. Cl.
CPC ........ *G06K 9/00456* (2013.01); *G06F 17/2223* (2013.01); *G06F 17/275* (2013.01); *G06K 9/3208* (2013.01); *G06K 9/6821* (2013.01); *G06K 2209/011* (2013.01)

(58) Field of Classification Search
CPC ................. G06K 9/00456; G06K 9/3208
USPC ...................................................... 382/185
See application file for complete search history.

(56) References Cited

U.S. PATENT DOCUMENTS

| | | | |
|---|---|---|---|
| 4,950,167 A | 8/1990 | Harris | |
| 5,425,110 A | 6/1995 | Spitz | |
| 5,771,712 A | 6/1998 | Campbell et al. | |
| 5,943,443 A * | 8/1999 | Itonori | G06K 9/72 358/403 |
| 6,005,986 A | 12/1999 | Ratner | |
| 6,137,905 A * | 10/2000 | Takaoka | G06K 9/3208 382/173 |
| 6,512,522 B1 | 1/2003 | Miller et al. | |
| 6,657,625 B1 | 12/2003 | Chik et al. | |
| 6,661,417 B1 | 12/2003 | Cheng | |
| 7,013,264 B2 | 3/2006 | Dolan et al. | |
| 7,027,054 B1 | 4/2006 | Cheiky et al. | |
| 7,106,905 B2 | 9/2006 | Simske | |
| 8,027,539 B2 | 9/2011 | Chen et al. | |
| 8,041,119 B2 | 10/2011 | Tsai et al. | |
| 2011/0043528 A1 | 2/2011 | Solomonov et al. | |

* cited by examiner

*Primary Examiner* — Ruiping Li
(74) *Attorney, Agent, or Firm* — LeighAnn Weiland; Veronica Weinstein (57) ABSTRACT

Disclosed are systems, computer-readable mediums, and methods for determining a text contains Chinese, Japanese, or Korean characters. A document image is received and binarized. The binarized document image is searched for connected components. A plurality of fragments is identified based on the connected components. A language hypothesis for each fragment of the plurality of fragments is determined. The language hypothesis has a probability rating. A subset of fragments from the plurality of fragments having the highest probability ratings is selected. The language hypothesis of each fragment in the subset of fragments is verified. A determination of the presence of Chinese, Japanese, or Korean characters is made based at least on the verification of the language hypothesis of the subset of fragments.

20 Claims, 6 Drawing Sheets

CHINESE, JAPANESE, OR KOREAN LANGUAGE DETECTION

CROSS REFERENCE TO RELATED APPLICATIONS

The present application claims the benefit of priority under 35 USC 119 to Russian Patent Application No. 2013156781, filed Dec. 20, 2013; the disclosure of which is incorporated herein by reference.

BACKGROUND

An important step in a document recognition process is analysis of a document image to extract various information about the document that is to be recognized. The analysis of the document image can identify the parts of the document with text, pictures, and tables, the language of the document, orientation of the document, logical structure of the document, etc.

Information about whether the document contains oriental writing (understood primarily to mean Chinese, Japanese or Korean characters) (hereinafter "CJK characters") is an important piece of information about the document being recognized. Special methods are used for documents that contain CJK characters during the analysis of the document image and also during character recognition.

SUMMARY

Disclosed are systems, computer-readable mediums, and methods for determining a text contains Chinese, Japanese, or Korean characters. A document image is received and binarized. The binarized document image is searched for connected components. A plurality of fragments is identified based on the connected components. A language hypothesis for each fragment of the plurality of fragments is determined. The language hypothesis has a probability rating. A subset of fragments from the plurality of fragments having the highest probability ratings is selected. The language hypothesis of each fragment in the subset of fragments is verified. A determination of the presence of Chinese, Japanese, or Korean characters is made based at least on the verification of the language hypothesis of the subset of fragments.

DETAILED DESCRIPTION

Described herein are systems and methods for determining if CJK symbols are contained within a document image, where the document image may be in any unknown orientation. The determination can be based on a subset of the symbols detected in an image of the document. For example, the presence of CJK symbols within a document can be determined even if there is only one line with CJK characters in the document image. Based on the determination of the presence of CJK symbols in a document, it may be desirable to exclude CJK languages from the languages being used in character recognition of the document to avoid launching resource-intensive CJK recognition methods.

In one embodiment, it is not important how the document image was obtained. For example, the document image can be obtained by scanning or photographing a document, created artificially, obtained from a third party, etc.

Figure 1:
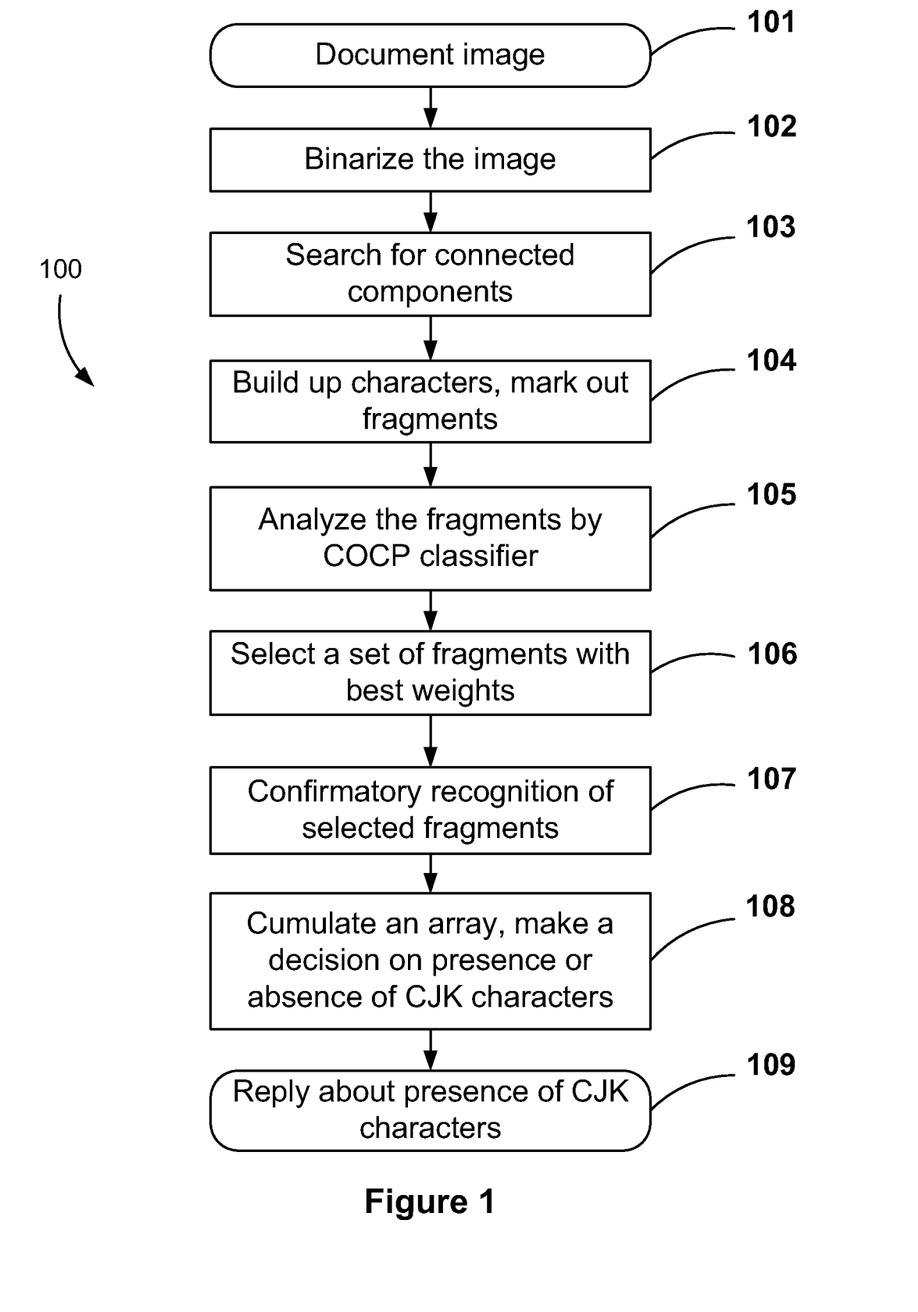
FIG. 1 illustrates a flow diagram of operations for determining whether CJK characters are present in a document image used in accordance with one embodiment.

FIG. 1 illustrates a flow diagram of operations (100) for determining whether CJK characters are present in a document image. To find the text elements, the document image (101) is binarized (102). For example, the binarization of the document image can be done using the method described in U.S. patent application Ser. No. 13/328,239 (U.S. 20120087587), filed on Dec. 16, 2011, entitled "BINARIZING AN IMAGE," which is hereby incorporated by reference in its entirety. The binarized document image can be searched for connected components (103). Connected components are a point or a collection of points in the binarized document image that have the same value and are located near one another. For example, a connected component can be found by selecting a point in the binarized document image and finding all surrounding points that have the same value. This repeats for each of the found surrounding points until no new points have been added. The result of this search is one connected components. In a binarized document image that includes text, the connected components can contain a character, a portion of a character, multiple characters.

A character-building process (104) can be carried out on the connected components to gather separate connected components which are parts of a single character. The character-building process can be a heuristic. For example, the character-building process can be based on various geometrical data such as the distance between connected components, their relative sizes, the mutual arrangement of the components, the average height of the connected components, the tentative height of the line, the proportions of characters built, etc.

Figure 2:
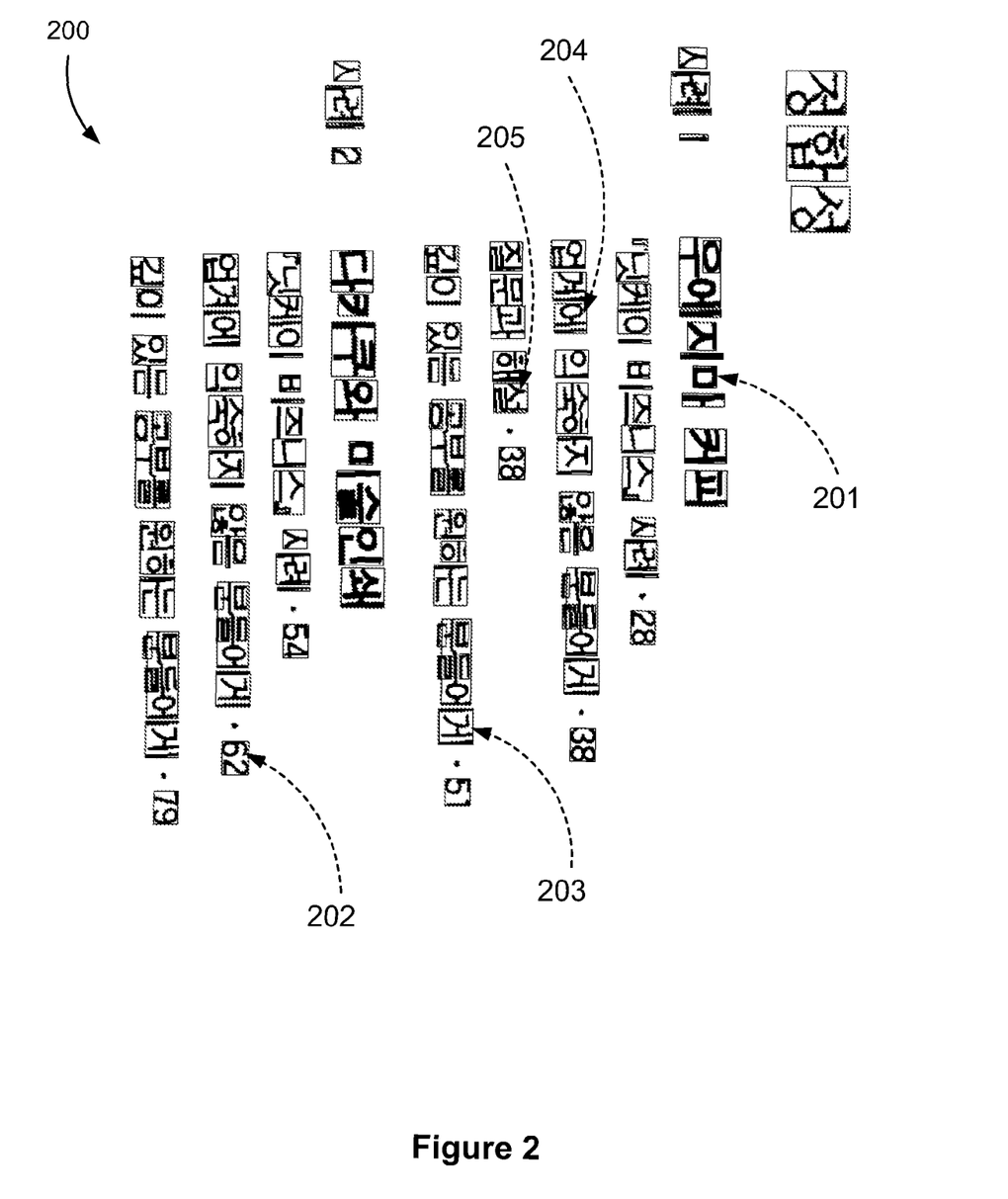
FIG. 2 illustrates an example of a character-building result performed in a document image with Korean text mixed in with numerical characters used in accordance with one embodiment.

The result of the character-building process is individual fragments that are described by rectangles, such that each rectangle hypothetically contains one character. A fragment is a portion of the text that represents, but is not limited to, a single character, two or more agglutinated characters, a portion of a single character, a single character and a portion of a second character, etc. If the fragment consists of one connected component (for example, European symbols without diacritics, simple CJK characters, digits, punctuation, etc.), the rectangle that describes the fragment will only contain the one connected component. FIG. 2 is an example of a document image (200) with Korean text mixed in with numerical characters after performing a character-building process. The document image (200) is turned on its side in a clockwise orientation. Fragments 201, 202, 203, 204, and 205 are exemplary fragments identified by the character-building process (104). The rectangles hypothetically contain one character each; however, the character-building process can erroneously fail to build a complete character. For example, fragment (201) is a fragment containing part of a character. The character-building process can also erroneously overbuild a character such that the detected fragment contains, for example, agglutinated characters. For example, fragment (202) contains two agglutinated characters. In another example, fragment (203) contains one character and an erroneously agglutinated part of a second character.

In an operation, the results of the character-building process are analyzed (105) using a coarse classifier called a coarse oriental characters presence (hereinafter "COCP"). The COCP classifier can receive input information, such as the fragments, that were found in the document image. The COCP classifier can determine the orientation of the document and the presence of CJK characters by analyzing the fragments. The orientation of a document and/or the presence of CJK characters can also be used as input into the COCP classifier. For example, the orientation of a document based upon the COCP classifier's analysis can be used as input into analyzing fragments. The COCP classifier can also evaluate the probability that a fragment contains a CJK character. For example, fragments with actual (properly built) CJK characters, if there are any CJK characters in the document image, likely receive the highest probability rating from the COCP classifier. While fragments that contain incomplete or agglutinated characters receive different, likely lower, probability ratings. The COCP classifier can also re-analyze one or more fragments based upon changes to the determined orientation and/or presence of CJK character values, e.g. if these values were detected during analyzing of fragments. In an operation, a set of fragments with the best COCP classifier ratings can be selected (106).

In one embodiment, the COCP classifier is implemented using a Bayesian network. The Bayesian network can model various hypotheses regarding what a particular fragment contains. For example, for each fragment the Bayesian network can model if a fragment contains a Koran character, an English character, a partial character, multiple characters, etc. The integrated information about a variety of fragments can be used to determine what a particular fragment contains.

In an operation, the selected set of fragments can be verified by recognizing selected fragments (107). For example, to determine if a document contains CJK characters, the highest scoring fragments can be considered. For example, the top 10, 20, 30, 50, etc., COCP scoring fragments can be recognized in order to make a conclusion about whether there are or are not CJK characters in the document.

Figure 3:
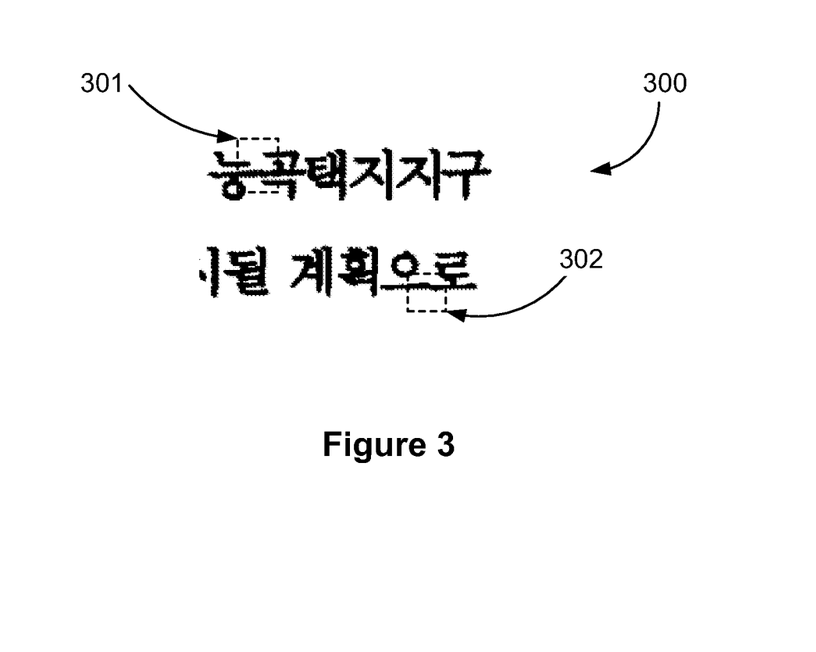
FIG. 3 illustrates an example of a part of a document image that includes Korean text used in accordance with one embodiment.

An ability to distinguish agglutinated (overbuilt) Korean characters from actual Korean characters is rather complex for a classification. It may look like Korean characters are indistinguishable from Chinese or Japanese characters, but there are some distinctive features that can be used to differentiate Korean text from Chinese or Japanese text. For example, Korean text in a document image can contain "glued characters." FIG. 3 is an example of a part of a document image (300) that includes Korean text containing two examples of glued characters (301) and (302). Glued characters are two or more characters that are contiguous to each other. Characters get glued when a document is printed because of the close distance between the characters. Further, when a document is imaged, such connections can be created, even if they did not exist before. Therefore, agglutinated Korean characters form a single connected component and cannot be separated. The glued characters reduce the quality of fragment separation and are another reason why there can be more than one character in a descriptive rectangle for one fragment.

Classifiers usually analyze each fragment independently, making conclusions about the class to which a fragment belongs based only on a certain group of features that the classifier has been trained on. The main problem of independent classifiers used in the task of finding CJK characters is the independent classifier's poor capacity to distinguish agglutinated (overbuilt) Korean characters from actual Korean characters, because with some page orientations, agglutinated and actual Korean characters can have similar features. As a result, under coarse filtration, improperly agglutinated characters can be classified among the best hypotheses of CJK fragments found on the page. During the confirmatory recognition stage, however, these fragments will not be recognized, which means that the presence of CJK characters in the document will mistakenly be rejected.

One of the reasons for erroneous results of similar classifiers is that, because the classifiers only know features of one fragment, it is impossible to understand whether the fragment is a Korean character (normal or turned) or whether the fragment is an agglutination of characters on a page tilted to one side. For these classifiers to work in a satisfactory manner, they require a number of complex features that are not only complicated to adjust, but also require significant resources to compute.

The COCP classifier used in the above described embodiments does not analyze each fragment independently; rather, the COCP classifier uses the accumulated information about the analysis of other fragments in the document image. For example, the orientation of the document can be determined by the classifying process and also concurrently used in classifying fragments. The accumulated information can be used to make conclusions about the current fragment and also to re-examine previous conclusions if there is reason to consider them erroneous. For example, if the COCP classifier initially assumes that the document is in a normal or upside down position but, by analyzing more fragments, the COCP classifier later determines the document is in clockwise or counter-clockwise mode, some or all of the previously classified or estimated fragments can be reanalyzed. This allows each fragment to be analyzed based upon the determined characteristics of the document image.

In one embodiment, the COCP classifier implements a Bayesian network that can make conclusions about the current fragment and re-examine previous conclusions. Information about raster and geometric properties of the current fragment can be used as features and can be automatically computed during the process of separating connected components. These features can be used both for analysis of the document image and during the recognition process, and this means that computing them does not require additional time or resources. Multiple features can be computed. For example, the following features for a fragment are computed:

1. The natural logarithm of the elongation, wherein the elongation may be calculated as the ratio of width to height;
2. The ratio of horizontal strokes count to a height of a fragment (Horizontal Strokes Count/height);
3. The ratio of vertical strokes count to a width of a fragment (Vertical Strokes Count/width);
4. The ratio of the longest black horizontal stroke length to a height of a fragment (Max Horizontal Stroke Length/height); and
5. The ratio of the longest white horizontal stroke length to a width of a fragment (Max Horizontal White Stroke Length/width).

Thus the COCP classifier uses information that the COCP classifier already has to determine features of the digital image. These features can also be used in classifying fragments. Because the COCP analyzes all of the fragments in a document image, the COCP can find not only Chinese and Japanese but also Korean characters, in arbitrary orientation as well. In an embodiment, the COCP classifier includes, for example, one or more of the following expert knowledge about the characteristics that any given document image may have:

1. Objects on the page can be in one of two orientations (NormalOrUpsidedown, and ClockwiseOrCounterclockwise). Two types of orientation can be sufficient for analysis because the features are invariant when rotated 180 degrees;

2. It is likely that all the characters on a page are in the same orientation. For example, it is extremely improbable that there are CJK characters in multiple orientations on the same page; and 3. On a Korean page or among Korean text it is more likely that agglutinated characters will be found than on a Chinese or a Japanese page or among Chinese or Japanese text.

Because the COCP classifier analyzes all the fragments on a page, it can infer that a page is turned to the side and contains Korean characters. This embodiment is described below. Because the COCP classifier can infer the orientation of a page, the COCP classifier can, for example, distinguish agglutinated characters from actual Korean characters.

The COCP classifier's variables and parameters can be adjusted depending on the problems to be solved and the conditions. In one embodiment, the following variables (random values) and their possible values can be used by the COCP classifier:

Language is a language of a page. The possible values are: ChineseOrJapanese, Korean, Other.

Orientation is an orientation of a page. The possible values are: NormalOrUpsidedown, ClockwiseOrCounterclockwise.

BuilderResult-i is a result of building fragment i. The possible values are: CJCharacter, KoreanCharacter, LetterOrNumber, OverbuildOrUnderbuild, Other.

IsCJK-i is an ancillary boolean deterministic variable. It has the value true if BuilderResult-i==CJCharacter or BuilderResult-i==KoreanCharacter, and otherwise has the value false.

Features-i are the features of fragment i; one of the possible sets of features was shown above.

Figure 5A:
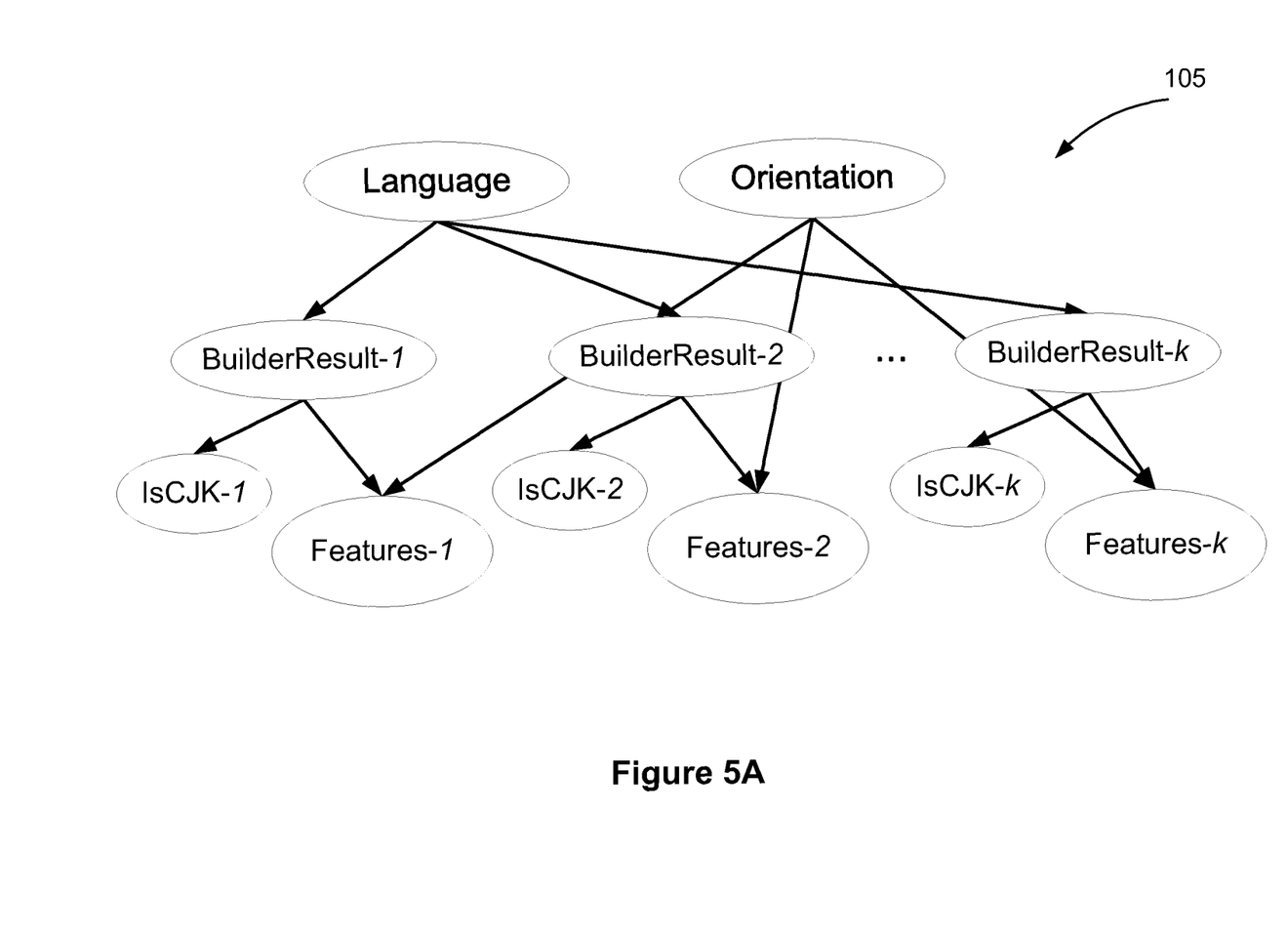
FIG. 5A illustrates a diagram of operations of a coarse oriental characters presence classifier used in accordance with one embodiment.
Figure 5B:
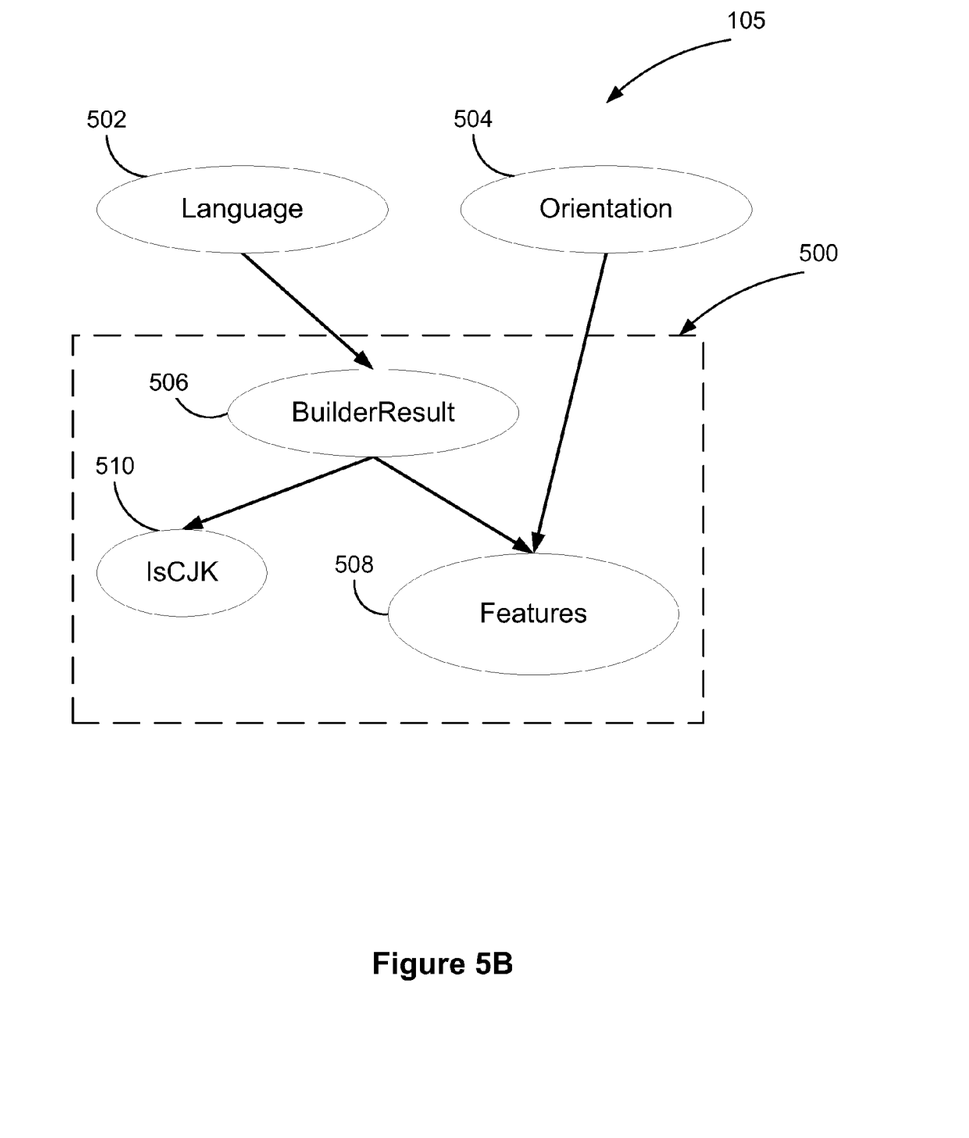
FIG. 5B illustrates a diagram of a group of variables that can be serialized to a distributed network used in accordance with one embodiment.

FIG. 5A illustrates a diagram of operations of the COCP classifier. In an embodiment, the number of groups of variables (e.g., BuilderResult-i, IsCJK-i, Features-i) depends on the number of fragments found on the page. Referring to FIG. 5B, the same diagram is illustrated using a "plate model," where a group of variables for one fragment (500) is shown. While classifying a particular document image, the group of variables (500) can be serialized to a detailed (unfold) network depending on the number of identified fragments.

Referring to FIG. 5B, each variable node (502, 504, 506, 508, 510) can be associated with a conditional probability distribution for the node condition based upon parents P(X|Parents(X)). The numerical values for the probability distribution can, for example, be adjusted during a preliminary training. The Features (508) variable is not discrete, so the conditional distribution for the Features (508) variable is a set of densities, one for each combination of the BuilderResult (506) variable and Orientation (504) variable. For example, the densities of a mixed Gaussian distribution can be used for the set of densities.

In some embodiments, the COCP classifier can be guided by inputting values for variables. Thus, a user can influence how the COCP classifier works by inputting values for some variables, such as, but not limited to, indicating permissible values for the Orientation (504) variable, the permissible values for the Language (502) variable, etc. The values entered by the user are added to the model as new evidence, changing a posteriori the distribution of the values of the variables "Orientation" and "Language."

Available information for fragment (e.g., features, prohibited languages, prohibited orientations, etc.) can be defined as "evidences" and denoted by e. The fragments of the document image can be sorted in accordance with the a posteriori probability P(IsCJK =true|e).

In one embodiment, the COCP classifier can be adjusted for special conditions by adding or removing different evidence from the model. For example, any document image can be in one of two orientations with equal probability. In other words a priori probability of the variable "Orientation" is P(NormalOrUpsidedown)=0.5, P(ClockwiseOrCounterclockwise)=0.5. If the system is provided with evidence that one document image is in a normal orientation, then a posteriori value of the variable "Orientation" can be shifted (concentrated) to one value. In other words a posteriori probability can be P(NormalOrUpsidedown)=1, P(ClockwiseOrCounterclockwise)=0. This probability distribution can change a posteriori probability distributions of other variables and can provide more reliable results of the classification.

Figure 4:
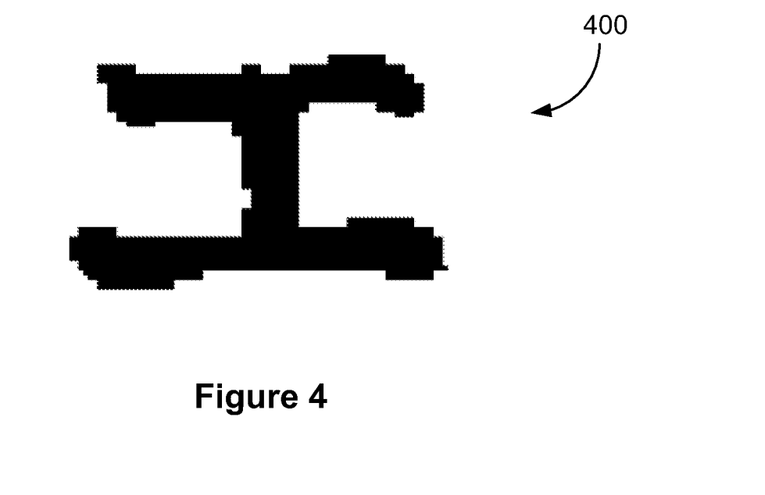
FIG. 4 illustrates an example of a CJK character that cannot be distinguished from a European character used in accordance with one embodiment.

In some cases, not all CJK characters can be distinguished from European letters, particularly when the orientation of the character is unknown. FIG. 4 illustrates an example of a CJK character that cannot be distinguished from a European character. For example, character (400) cannot be distinguished from the symbol H in a ClockwiseOrCounterclockwise orientation. In an embodiment, if there is a European character (e.g., a letter, combination of letters, symbol, etc.) that in some orientation is visually similar to a CJK character, then the CJK character has a European neighbor in the corresponding orientation. The presence of such characters makes it more difficult to make a decision about whether there is CJK writing in the document. If the COCP classifier finds European neighbors in some European text, these fragments can be recognized at the stage of confirmatory recognition of the best CJK hypotheses of this page. In order to avoid such errors, the information about the CJK characters that have European neighbors can be stored in the system with an indication of the corresponding orientation. For example, the neighbor information can be stored in a table, database, or in some other form.

In an embodiment, determining whether CJK characters are present can be based on a confirmatory recognition (107) operation of the selected set of fragments (106). For example, assume that the COCP classifier has identified (20 for example) best hypotheses of CJK characters (106). A confirmatory recognition (107) operation can be performed on the selected fragments, where for each hypothesis a recognition is performed in four possible orientations. An orientation can be defined by O, where O ∈ {NoRotation, Clockwise, Counterclockwise, Upsidedown}. For each possible orientation O, an array of votes is stored, where the identifier of the character recognized can be registered (e.g., in Unicode) and the confidence of the character's recognition can also be registered (108). If in one of the orientations, a fragment can be recognized with sufficiently great confidence, such as higher than some confidence threshold T, then this result can be considered as a vote and the vote's parameters are added to the array of votes for that orientation.

The total confidence for each orientation in the set of orientations is computed and the orientation O* that is most suitable is selected. For example, the vote count can be totaled for each orientation. In another embodiment, the total confidence can be calculated as the average confidence of the recognition of all of the votes. The orientation O* can be, for example, the orientation with the maximum total confidence. A decision on the presence of CJK characters in document can be based on several conditions, including, but not limited to:

1. The total confidence for the best orientation O* is more than a specified threshold t;

2. The total confidence for orientation O* is significantly higher than the total confidence of the next highest orientation. For example, the total confidence can be higher than the next highest orientation by a factor of difference of 1.5-2; and 3. Characters from the array of votes for orientation O* contain a vote in each of four orientations that does not have a European neighbor in that orientation. In other words, for each orientation, a vote is found in array O* that does not have a European neighbor in the orientation studied.

The COCP classifier can be modified using pre-defined values. For example, the factor of difference as well as the number of hypotheses tested in operation (106) can be pre-defined. The predefined values can be provided by, but not limited to, a user, a database, or a remote location.

If an accumulated set of fragments meets the described conditions, then a decision that CJK characters are present in the document can be made and the confirmatory recognition (107) operation can be put on hold. If, however, the accumulated set of fragments do not meet the conditions and all the hypotheses provided by the COCP are recognized, then a decision that no CJK characters are present in the document can be made (108). In an operation (109) a reply about the presence of CJK characters can be issued. The reply, for example, can be based on the decision that CJK characters are present or not present in the document.

An example is provided to clearly show how the COCP classifier corrects conclusions about the content of the fragment when compared to an independent classifier that works based on the same features. Referring now to FIG. 2, fragments (202) and (203) are agglutinations of more than one character, but they have received a sufficiently high rating from an independent classifier (i.e., a high probability that the data fragment contains a CJK character). Fragment (202), which is an agglutination of the digits 6 and 2 turned on its side, obtained a probability rating of 0.877 of being a CJK character, and fragment 203, which is a Korean character agglutinated with a vertical line from a neighboring character, obtained a rating of 0.860. If these fragments are among the best representatives of CJK hypotheses on the page and are passed on for confirmatory recognition, they will not be recognized in any orientation. In contrast, the COCP classifier, described above, was properly able to infer that the page was turned because it analyzed all the fragments as a whole. The ratings given by COCP for fragments (202) and (203) are 0.005 and 0.044 respectively.

In another example, fragments (204) and (205) are properly marked out to single Korean characters, but they received low ratings from an independent classifier—0.120 and 0.435 respectively—because the classifier could not understand that the page was turned on its side. In contrast, the COCP classifier gave these fragments high ratings: 0.847 and 0.959, respectively, because the COCP classifier determined the orientation of the document and used the orientation in analyzing the fragments. Hence fragments (204) and (205) showed up on the list of the best representatives of CJK hypotheses and the presence of Korean characters in the document was accurately detected.

Figure 6:
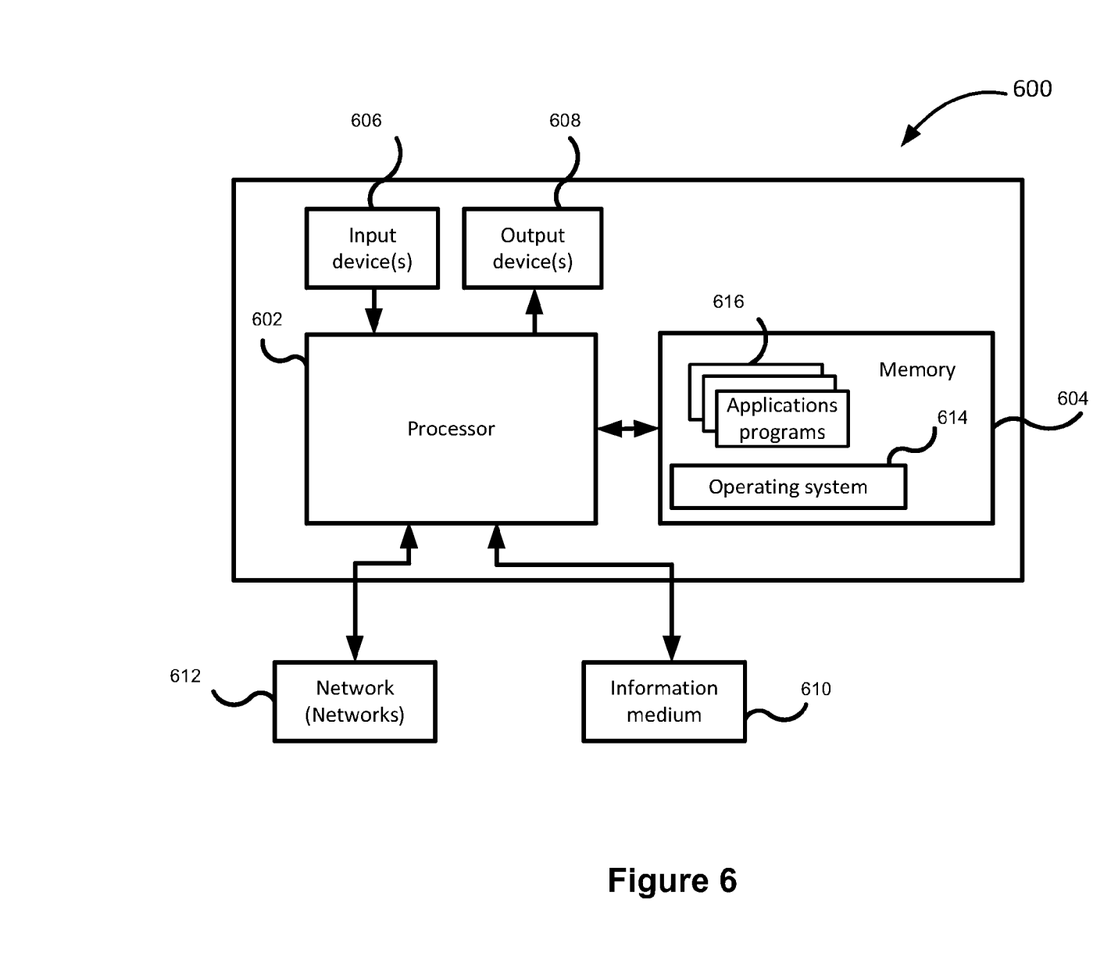
FIG. 6 shows an example of a computer platform that can be used in accordance with one embodiment.

FIG. 6 shows a possible example of a computer platform (600) that may be used to implement the described embodiments. The computer platform (600) includes at least one processor (602) connected to a memory (604). The processor (602) may be one or more processors and may contain one, two or more computer cores. The memory (604) may be RAM and may also contain any other types or kinds of memory, particularly non-volatile memory devices (such as flash drives) or permanent storage devices such as hard drives and so forth. In addition, an arrangement can be considered in which the memory (604) includes information-storage media physically located elsewhere within the computer facilities (600) such as cache memory in the processor (602), and memory used as virtual and stored on external or internal permanent storage (610).

The computer platform (600) also usually has a certain number of input and output ports to transfer information out and receive information. For interaction with a user, the computer platform (600) may contain one or more input devices (such as a keyboard, a mouse, a scanner, and other) and a display device (608) (such as a liquid crystal display). The computer facilities (600) may also have one or more permanent storage devices (610) such as an optical disk drive (CD, DVD, or other), a hard disk, or a tape drive. In addition, the computer facilities (600) may have an interface with one or more networks (612) that provide connections with other networks and computer equipment. In particular, this may be a local area network (LAN), a wireless Wi-Fi network and may or may not be joined to the World Wide Web (Internet). It is understood that the computer facilities (600) include appropriate analog and/or digital interfaces between the processor (602) and each of the components (604, 606, 608, 610 and 612).

The computer facilities (600) are managed by the operating system (614) and include various applications, components, programs, objects, modules and other, designated by the consolidated number 616.

In general, the routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements of disclosed embodiments. Moreover, various embodiments have been described in the context of fully functioning computers and computer systems, those skilled in the art will appreciate that the various embodiments are capable of being distributed as a program product in a variety of forms, and that this applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

In the above description numerous specific details are set forth for purposes of explanation. It will be apparent, however, to one skilled in the art that these specific details are merely examples. In other instances, structures and devices are shown only in block diagram form in order to avoid obscuring the teachings.

Reference in this specification to "one embodiment" or "an embodiment" means that a particular feature, structure, or characteristic described in connection with the embodiment is included in at least one embodiment. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

While certain exemplary embodiments have been described and shown in the accompanying drawings, it is to be understood that such embodiments are merely illustrative and not restrictive of the disclosed embodiments and that these embodiments are not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

This description shows the basic inventive concept of the inventors, which cannot be limited by the hardware mentioned earlier. It should be noted that hardware is primarily intended to solve a narrow problem. As time goes by and as technology develops, such a task becomes more complex or it evolves. New tools arise that are capable of meeting new demands. In this sense, it is appropriate to look at this hardware from the point of view of a class of technical tasks they can solve, not simply as a technical implementation on some base of elements.

What is claimed is:

1. A method for determining a text contains Chinese, Japanese, or Korean characters, the method comprising:
    receiving a document image;
    binarizing the document image;
    searching for connected components in the binarized document image;
    identifying a plurality of fragments based on the connected components;
    determining a language hypothesis for each fragment of the plurality of fragments, wherein the language hypothesis has a probability rating;
    selecting a subset of fragments from the plurality of fragments having highest probability ratings;
    verifying, using a processor, the language hypothesis of each fragment in the subset of fragments; and
    determining, using the processor, that Chinese, Japanese, or Korean (CJK) characters are present in the received document image based at least on the verification of the language hypothesis of the subset of fragments.

2. The method of claim 1, further comprising:
    analyzing features of a first subset of the plurality of fragments; and
    determining a document characteristic based upon the analyzing features of the first subset of the plurality of fragments, wherein determining the language hypothesis of each fragment is based in part on the document characteristic.

3. The method of claim 2, wherein the document characteristic is the document orientation.

4. The method of claim 2, further comprising:
    determining a second, different value of the document characteristics based upon analyzing features of a second, different subset of the plurality of fragments; and
    reanalyzing the features of the first subset of the plurality of fragments using the second, different value of the document characteristics.

5. The method of claim 1, further comprising:
    recognizing the subset of fragments in each of four orientations;
    calculating a recognition confidence of each of the selected subset of fragments in each of the four orientations;
    determining for each of the subset of fragments a vote for an orientation based upon the calculated confidence level; and
    determining an orientation of the document image based upon the votes.

6. The method of claim 1, wherein a Bayesian network is used to determine the language hypothesis of each fragment of the plurality of fragments.

7. The method of claim 1, wherein determining a language hypothesis of a fragment comprises identifying features of the fragment, wherein the features are based on information about raster and geometric properties of the fragment.

8. The method of claim 7, wherein the features of the fragment comprise at least one of:
    a natural logarithm of a ratio of a width and a height of the fragment, a ratio of a horizontal strokes count and the fragment height, a ratio of a vertical strokes count and the fragment width, a ratio of a maximum horizontal black stroke length and the fragment height, and a ratio of the maximum horizontal white stroke length and the fragment width.

9. The method of claim 1, wherein a fragment comprises one of: a single character, two or more agglutinated characters, a portion of a single character, a single character and a portion of a second character.

10. The method of claim 5, wherein each vote for a first orientation is further checked for existence of a European neighbor character in any orientation.

11. A system comprising:
    one or more processors configured to:
    receive a document image;
    binarize the document image;
    search for connected components in the binarized document image;
    identify a plurality of fragments based on the connected components;
    determine a language hypothesis for each fragment of the plurality of fragments, wherein the language hypothesis has a probability rating;
    select a subset of fragments from the plurality of fragments having highest probability ratings;
    verify the language hypothesis of each fragment in the subset of fragments; and
    determine that Chinese, Japanese, or Korean (CJK) characters are present in the received document image based at least on the verification of the language hypothesis of the subset of fragments.

12. The system of claim 11, wherein the one or more processors are further configured to:
    analyze features of a first subset of the plurality of fragments; and
    determine a document characteristic based upon the analyzing features of the first subset of the plurality of fragments, wherein determining the language hypothesis of each fragment is based in part on the document characteristic.

13. The system of claim 12, wherein the document characteristic is the document orientation.

14. The system of claim 12, wherein the one or more processors are further configured to:
   determine a second, different value of the document characteristics based upon analyzing features of a second, different subset of the plurality of fragments; and
   reanalyze the features of the first subset of the plurality of fragments using the second, different value of the document characteristics.

15. The system of claim 11, wherein the one or more processors are further configured to:
   recognize the subset of fragments in each of four orientations;
   calculate a recognition confidence of each of the selected subset of fragments in each of the four orientations;
   determine for each of the subset of fragments a vote for an orientation based upon the calculated confidence level; and
   determine an orientation of the document image based upon the votes.

16. A non-transitory computer-readable medium having instructions stored thereon, the instructions comprising:
   instructions to receive a document image;
   instructions to binarize the document image;
   instructions to search for connected components in the binarized document image;
   instructions to identify a plurality of fragments based on the connected components;
   instructions to determine a language hypothesis for each fragment of the plurality of fragments, wherein the language hypothesis has a probability rating;
   instructions to select a subset of fragments from the plurality of fragments having highest probability ratings;
   instructions to verify the language hypothesis of each fragment in the subset of fragments; and
   instructions to determine that Chinese, Japanese, or Korean (CJK) characters are present in the received document image based at least on the verification of the language hypothesis of the subset of fragments.

17. The non-transitory computer readable medium of claim 16, the instructions further comprising:
   instructions to analyze features of a first subset of the plurality of fragments; and
   instructions to determine a document characteristic based upon the analyzing features of the first subset of the plurality of fragments, wherein determining the language hypothesis of each fragment is based in part on the document characteristic.

18. The non-transitory computer readable medium of claim 17, wherein the document characteristic is the document orientation.

19. The non-transitory computer readable medium of claim 17, the instructions further comprising:
   instructions to determine a second, different value of the document characteristics based upon analyzing features of a second, different subset of the plurality of fragments; and
   instructions to reanalyze the features of the first subset of the plurality of fragments using the second, different value of the document characteristics.

20. The non-transitory computer-readable medium of claim 16, the instructions further comprising:
   instructions to recognize the subset of fragments in each of four orientations;
   instructions to calculate a recognition confidence of each of the selected subset of fragments in each of the four orientations;
   instructions to determine for each of the subset of fragments a vote for an orientation based upon the calculated confidence level; and
   instructions to determine an orientation of the document image based upon the votes.

* * * * *